Jan. 17, 1967  C. DOUGHERTY  3,299,132
PROCESS FOR GRANULATING UREA
Filed Oct. 16, 1963
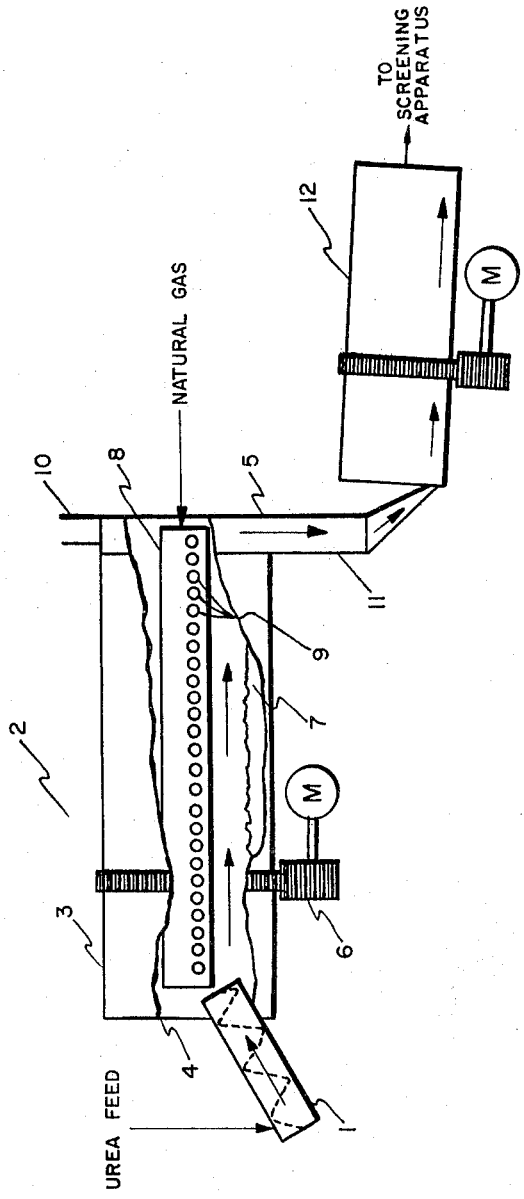
C. DOUGHERTY-*INVENTOR*
BY *Kenneth E Prince*
ATTORNEY

United States Patent Office 3,299,132
Patented Jan. 17, 1967

3,299,132
PROCESS FOR GRANULATING UREA
Charles Dougherty, Memphis, Tenn., assignor to W. R. Grace & Co., New York, N.Y., a corporation of Connecticut
Filed Oct. 16, 1963, Ser. No. 316,628
1 Claim. (Cl. 260—555)

This invention relates to urea. More particularly it relates to a process for preparing urea granules having greatly reduced caking properties.

In summary, this invention is directed to a continuous method for granulating urea comprising tumbling a bed of urea initially charged as crystalline urea in a treating zone having an entrance and an exit while maintaining the temperature of said bed at about 104–130° C., and repeatedly passing urea from said tumbling bed through a high temperature zone heated to a temperature greater than the melting point of urea, thereby incipiently fusing the surfaces of said urea and causing agglomeration of said urea when said urea re-enters said tumbling bed. Urea is continuously removed from the said zone at such rate as to provide a residence time of said urea in said zone of about 30 minutes to 17 hours while continuously feeding urea into said zone at about the same rate that urea is removed therefrom, and recovering the thus treated urea.

Preferred embodiments of this invention include: (a) Maintaining the temperature of the tumbling bed of urea within the temperature range of about 115–125° C. (b) Maintaining the residence time of urea in the treater of about 45–125 minutes. (c) Screening the urea product exiting the reactor to remove all oversize particles (i.e., particles retained on about a 4 mesh, U.S. standard screen), thereby obtaining an oversize-free product. (d) Crushing said oversize particles so that the crushed urea will pass about a 40 mesh, U.S. standard screen and recycling said crushed urea to the treating zone. (e) Screening the thus obtained oversize-free product to obtain product of a predetermined particle size (e.g., that retained on 8, 12, 16, 20, 30, or 40 mesh, U.S. standard screens) and recycling all under-sized particles to the treater.

The figure accompanying this specification is a schematic flow diagram of the process of my invention.

The high temperature zone, wherein the surfaces of urea particles are melted, can be heated directly (e.g., by flames produced by the combustion of fuel gas or other fuel) or indirectly (e.g., by heat supplied via radiation from electrical resistance heaters or from surfaces heated by the combustion of fuels or by heat supplied via convection currents from heated ductwork). Other means of supplying heat to said zone will be obvious to those skilled in the art.

It is well known that many organic and inorganic compounds in powdered, crystalline, prill, or granular form have a great tendency to cake and form more or less regid solid masses when stored for any significant period of time. The ultimate consumer therefore usually must crush or otherwise break up these masses before they can be used for their intended purpose. As an example, the caking tendencies of various fertilizer materials necessitate the expenditure of much labor and time in order to render these materials suitable for even distribution in the area to be fertilized and also to avoid or substantially eliminate clogging and jamming of the distribution machinery. Particulate urea is especially susceptible to the difficulties mentioned.

At the present time particulate urea is most commonly marketed in the form of crystals and prills. The crystalline forms of urea vary from long needlelike crystals to rectangular or square-shaped crystals of relatively large size. Urea prills are small spherical particles about 700–1600 microns in diameter which are formed by cooling droplets of molten urea in a stream of moving air within a tall (e.g., 100–150 feet) tower. By the very nature of the prilling process, a product of lower purity than crystalline urea is produced. For example, the crystalline urea of commerce contains about 0.02–0.3% by weight of biuret, a substance toxic to some forms of plant life, while urea prills contain about 1–2% by weight of biuret. Also crystalline urea contains substantially no free ammonia while urea prills often contain as much as about 150 parts per million of free ammonia by weight. The presence of free ammonia in urea is objectionable, because of the adverse effect which it has upon the pH of urea solutions in the manufacture of certain resins, and because its partial release during shipment results in a highly disagreeable working atmosphere in areas where it is subsequently stored and handled. In addition, a sizeable capital investment is required for the prilling tower and associated equipment. Despite these disadvantages, prill urea has become the favorite market form of urea, because the caking tendency of prill urea is only about 40–50% as great as that of crystalline urea. Nevertheless, the caking tendency of prill urea constitutes a very serious handling problem.

In practice, the particulate urea of commerce is packaged in multi-ply bags having moisture barriers such as polyethylene film plies or asphalt laminate plies. Regardless of the particular shape and form of the urea that is packaged in this manner, it is always found that the mass tends to set up into a single solid cake when stored in the ordinary manner. In some instances, particularly with the needlelike crystals, a hard solid cake is formed in a matter of hours when the bagged urea is subjected to very slight pressures (ca. 1–5 lbs. per square inch).

Various methods have been proposed for avoiding the caking problems noted above. One prior proposal has been to completely melt the particulate urea followed by spraying air into a small stream of the molten mass to form small uniform pellets. Other proposals involve addition of appreciable amounts (ca. 1–5% or more by weight) of various so-called "conditioning agents" such as clay or basic magnesium carbonate. All of these prior proposals have one or more disadvantages, for example: (a) The production of weak and readily disintegratable pellets. (b) The requirement for expensive equipment and/or time consuming processes. (c) The introduction of relatively large quantities of insoluble impurities (e.g., clay) into the urea.

I have made the surprising and completely unexpected discovery that substantially non-caking urea granules can be prepared by tumbling a bed of urea initially charged as crystalline urea in a treater while maintaining the bed temperature at about 104–130° C. and repeatedly passing urea from said bed through a high temperature zone heated to a temperature above the melting point of urea while providing a residence time of said urea in said treater of about 30 minutes to 17 hours. This is truly an unexpected and completely unobvious discovery, because my previous attempts to prepare substantially non-caking particles from urea prills by the general technique of this invention failed to give the desired result. On the contrary, the caking tendency of the thus treated urea prills was actually increased to a value about 90% greater than that of untreated prills.

Previous to my invention, urea granules (agglomerates of small urea particles, e.g., crystals or small prills) have been prepared by other well-known granulation techniques. Since the resulting granules were relatively soft, of inferior form, and possessed of pronounced caking tendencies, they failed to gain any substantial market acceptance.

The product prepared by the process of my invention comprises hard granules of urea having substantially the high purity of crystalline urea. Further, while said product, on visual observation, resembles urea prills, it has a substantially lower caking tendency than said prills.

Using the process of my invention, I have obtained excellent results when feeding crystalline urea containing less than about 0.1% moisture by weight; I have also obtained excellent results when feeding crystalline urea that contained more than about 1.6% moisture by weight. Thus, my process is applicable to the crystalline urea of commerce which contains about 0.1–0.5% moisture by weight.

The present invention is illustrated further by the following examples which are illustrative only and which are not intended to limit the scope of my invention.

*Example 1*

The figure is a flow diagram of the apparatus used in this example.

Crystalline urea (analyzing 0.07% biuret, by weight, about 0.5% moisture, by weight, and about 10 parts per million of free ammonia, by weight, and having an average particle diameter of about 390 microns) was supplied continuously to screw conveyor 1, the speed of which regulated the rate that said urea was fed into a treater, or treating zone, shown generally at 2. Said zone consisted of a hollow steel cylinder 3 (having a shell, an entrance end 4, and an exit end 5). Said cylinder was mounted on rollers (not shown) and provided with rotating means, shown generally at 6, so that it could be rotated at a constant speed (e.g., 6–10 revolutions per minute). The treating zone was tilted sufficiently to cause the urea to move gradually toward the exit end 5 of said zone. This arrangement provided an average residence time (i.e., period that a urea particle remained in the treater) of about 45 minutes when feeding urea into the system at about 600 lbs. per hour. Mounted inside the treater shell were horizontal lifting flights (not shown) which lifted urea from a urea bed 7 in the bottom section of the treater as the treater rotated and allowed the thus lifted urea to fall back into said bed. A horizontal gas burner (substantially the full length of the treater) and having gas and air regulating means (not shown) was mounted inside the treater about half-way between the central axis and shell. Said burner was not attached to the treater shell. The burner was fed a mixture of natural gas and air which burned as it issued from multiple closely spaced ports 9. This arrangement provided a linear flame front along a substantial portion of the treater's length. The lifting flights and burner were arranged so that a substantial portion of the urea lifted by said flights fell back through the flame (not shown). The use of an internal baffle (not shown) to deflect falling urea into the flame enhanced this effect. Products of combustion were removed via vent 10, and the urea was cooled continuously by a large excess of secondary air, entering the treater at 4, which was pulled through the system by an exhaust fan (not shown). As shown in the flow diagram the air flow is concurrent with the urea flow, but the system can be arranged to provide countercurrent flow. Heat was also removed by passing a cooling medium (e.g., water) over the shell of the treater and through jackets (not shown) on the burner and deflecting baffle. This was important, because maintaining a cool treater shell prevented the buildup of the urea on the lifting flights.

The depth of the urea bed in the treater was regulated by the height of a ring dam (not shown) at the discharge end of the treater. The apparatus was operated so that the urea moved through the unit, falling repeatedly through the flame and back into the urea bed, thereby attaining a maximum bed temperature of about 124° C. at the discharge end of said bed. Momentary surface temperatures were high enough to incipiently fuse the surfaces of the urea particles (melting point, ca. 133° C.) as they fell through the flame, thereby causing agglomeration to occur as said particles re-entered the urea bed. A small quantity of urea dust, passing out with the exhaust air and combustion gases, was recovered in a scrubbing unit (not shown).

Product left the treater through chute 11 which was fitted with an air lock (not shown) and passed into a cooler 12 of standard design where said product was cooled. The cooled product was screened with a screening apparatus of standard design (not shown).

In this run crystalline urea (average diameter ca. 390 microns) containing about 0.5% moisture by weight, about 0.07% biuret by weight, and less than about 10 parts per million of free ammonia by weight was fed into the system at about 600 lbs. per hour, and product was removed at about the same rate. Said product, after cooling to about 35–50° C., was screened into three cuts. The first cut (i.e., Cut No. 1) consisted of oversized particles (i.e., particles retained on a 4 mesh, U.S. standard screen). The second cut (i.e., Cut No. 2) consisted of particles that passed through said 4 mesh screen and were retained on a 30 mesh, U.S. standard screen. The third cut (i.e., Cut No. 3) consisted of particles passing through said 30 mesh screen.

At the end of 24 hours operation product in Cut No. 1 weighed 470 lbs., that in Cut No. 2 weighed 11,910 lbs., and that in Cut No. 3 weighed 1,780 lbs.

The product in Cut No. 2 consisted of hard granules having an average particle diameter of about 1100 microns. Said product analyzed 0.08% moisture by weight, 0.26% biuret by weight, and 23 parts per million of free ammonia by weight. This product was suitable for use as a fertilizer and for industrial use (e.g., the preparation of resins and glues).

The product in Cut No. 1 was suitable for use in making fertilizer solutions and that in Cut No. 3 was suitable for use as feed for ruminant animals, for making fertilizer solutions, and for industrial uses (e.g., the preparation of resins and glues).

I used a seven day warehouse stack test to determine the caking tendency of a randomly selected sample of the product obtained in Cut No. 2 and to compare the caking tendency of said product with that of randomly selected samples of crystalline urea and urea prills.

In this determination, the urea to be tested is bagged (ca. 100 lbs. per bag), and the test bags are placed horizontally on a wooden pallet of the type normally used for commercial warehouse storage. The same type of bag and bag closure are employed as in routine commercial production. The test bags are arranged on the pallet in layers of 4 bags each, one bag along each side of the pallet. If there is an insufficient number of test bags to complete a layer on the pallet, additional bags of urea are added as ballast. Six layers of bags are placed on the pallet.

The pallet and test material is then placed in warehouse storage, and weight is added by stacking two full pallets of commercially bagged urea (6×4=24 bags/pallet) on top of it. The test pallet is stored in this condition for 7 days.

At the end of the 7 day storage period, the test bags are carefully removed from the pallet, each is opened at one end, and its content is poured onto a 2 mesh, U.S. standard screen which retains any lumps of caked material that may have formed. The lumps are retrieved and weighed. The weight, in lbs., of the cake retained on said screen constitutes a quantitative measure of the urea's caking tendency.

Results of this determination are presented in the following table:

| Material tested: | Weight, in lbs., of material retained on 2 mesh, U.S. standard screen |
|---|---|
| Product from Cut No. 2[1] | None |
| Urea prills[1] (control) | 42 |
| Crystalline urea[1] (control) | 100 |

[1] Sample selected at random.

Example 2

The general granulation procedure of Example 1 was repeated. However, in this instance, after starting the run with crystalline urea feed having substantially the same particle size and composition as that used in the preceding example, all fine product (i.e., product passing a 30 mesh, U.S. standard screen) was recycled to the treater. In addition, all over size product (i.e., product retained on a 4 mesh U.S. standard screen) was crushed to pass a 40 mesh, U.S. standard screen and recycled to the treater. Thus, after the initial start up period, the material fed to the treater consisted of crystalline urea and recycled product. The recycled product consisted of said fine product and said crushed oversized product.

Operating details, the results of analyses of the crystalline urea feed and of product, and the results of caking tests are presented in the following table:

| | |
|---|---|
| Feed rate, lbs./hr.: | |
| Crystalline urea | 524 |
| Recycled urea | 76 |
| Total urea to treater | 600 |
| Recycled ratio (weight ratio, recycled urea): | |
| Crystalline urea | 0.14 |
| Duration of run, hrs. | 6.0 |
| Average particle diameter, microns: | |
| Crystalline urea | 390 |
| Product[a] | 1100 |
| Moisture content, percent by weight: | |
| Crystalline urea feed | 0.55 |
| Product[a] | 0.10 |
| Biuret content, percent by weight: | |
| Crystalline urea | 0.07 |
| Product[a] | 0.23 |
| Free ammonia, parts per million by weight: | |
| Product | 22 |
| Caking tendency[b c d]: | |
| Crystalline urea (control) | 100 |
| Product | 0 |
| Urea prills (control) | 43 |

[a] Product passing a 4 mesh and retained on a 30 mesh, U.S. standard screen.
[b] A seven day warehouse stack test was used to determine the caking tendency.
[c] Weight in pounds of material retained on a 2 mesh, U.S. standard screen.
[d] Samples selected at random.

Example 3

Two additional runs were made according to the general procedure of Example 2. However, in the first of these runs (Run No. 3A), product passing a 4 mesh and retained on a 20 mesh, U.S. standard screen was retained for testing. In the second of these runs (Run No. 3B), product passing a 4 mesh and retained on a 12 mesh U.S. standard screen was retained for testing. In each run all oversize product was crushed to pass a 40 mesh, U.S. standard screen and recycled along with all fine product. Operating details and the results of analyses and caking tests are presented in the following table.

| Run No. | 3A | 3B |
|---|---|---|
| Feed Rate, lbs./hr.: | | |
| Crystalline Urea | 430 | 221 |
| Recycled Urea | 170 | 379 |
| Total Urea to Treater | 600 | 600 |
| Recycle Ratio (Weight Ratio, Recycled Urea: Crystalline Urea) | 0.40 | 1.71 |
| Duration of Run, hrs. | 12.7 | 11.5 |
| Average Particle Diameter, microns: | | |
| Crystalline Urea | 360 | 400 |
| Product | [1] 1,160 | [2] 2,000 |
| Moisture Content, Percent by Weight: | | |
| Fresh Feed | 0.66 | 0.41 |
| Product | [1] 0.07 | [2] 0.07 |
| Biuret Content, Percent by Weight: | | |
| Fresh Feed | 0.08 | 0.08 |
| Product | [1] 0.22 | [2] 0.12 |
| Free Ammonia, p.p.m. by Weight: Product | [1] 24 | [2] 17 |
| Caking Tendency: [3][4][5] | | |
| Crystalline Urea (Control) | 100 | 100 |
| Product | [1] 0 | [2] 0 |
| Urea Prills (Control) | 43 | 43 |

[1] Product passing a 4 mesh and retained on a 20 mesh, U.S. standard screen.
[2] Product passing a 4 mesh and retained on a 12 mesh, U.S. standard screen.
[3] A seven-day warehouse stack test was used to determine the caking tendency.
[4] Weight, in pounds of material retained on a 2 mesh, U.S. standard screen.
[5] Samples selected at random.

What is claimed is:

A continuous process for preparing urea granules having substantially no tendency to cake comprising;

(a) tumbling a bed of urea initially charged as crystalline urea in a treating zone having an entrance and an exit while maintaining the temperature of said bed at about 115–125° C.;

(b) repeatedly passing urea from said tumbling bed through a high temperature zone having a temperature higher than the melting point of urea, said zone consisting of a flame produced by burning natural gas in air, thereby incipiently fusing the surfaces of said urea, and returning the thus heated urea to said tumbling bed, thereby causing said urea to agglomerate on re-entering said tumbling bed and passing out of contact with said flame;

(c) continuously removing urea from said treating zone at such rate as to provide a residence time of said urea in said treating zone of about 45–125 minutes while continuously feeding urea including urea recycled from later mentioned sizing and recycling steps into said treating zone at about the same rate that urea is removed therefrom;

(d) screening urea exit said treating zone and removing all oversize particles, that is, particles retained on about a 4 mesh, U.S. standard screen, thereby obtaining an oversize-free product;

(e) crushing said oversize particles so that the crushed particles will pass about a 40 mesh, U.S. standard screen;

(f) recycling said crushed particles to said treating zone;

(g) screening the aforesaid over-size free product to recover therefrom; (1) a product within the size range of 8 to 40 mesh, U.S. standard, said product within said size range forming no particles retained on a 2 mesh, U.S. standard screen on being subjected to a seven day warehouse stack test; and (2) undersize particles, said undersize particles being smaller than said product; and (h) recycling said undersize particles to said treating zone.

References Cited by the Examiner

FOREIGN PATENTS 612,359  1/1961  Canada.

ALEX MAZEL, *Primary Examiner.*

HENRY R. JILES, *Examiner.*